(No Model.)

L. R. WITHERELL.
WEIGHING APPARATUS.

No. 340,181. Patented Apr. 20, 1886.

WITNESSES
Villette Anderson.

Loren R. Witherell
INVENTOR

By Jas. Fullerton
ATTORNEY

UNITED STATES PATENT OFFICE.

LOREN R. WITHERELL, OF DAVENPORT, IOWA, ASSIGNOR TO EDWARD RUSSELL, JOHN N. GREER, AND HENRY B. HARFORD, ALL OF SAME PLACE.

WEIGHING APPARATUS.

SPECIFICATION forming part of Letters Patent No. 340,181, dated April 20, 1886.

Application filed October 24, 1885. Serial No. 180,817. (No model.)

*To all whom it may concern:*

Be it known that I, LOREN R. WITHERELL, a citizen of the United States, residing at Davenport, in the county of Scott and State of Iowa, have invented certain new and useful Improvements in Weighing Apparatus; and I do hereby declare the following to be a full, clear, and exact description of the invention, such as will enable others skilled in the art to which it appertains to make and use the same.

My invention has for its object a simple, durable, and easily-manufactured weighing apparatus adapted to the weighing of all articles in common use, whether in the family, the factory, or store, or on the farm. It has no weights to be lost or mislaid or delicate machinery to get out of order, while it is complete in itself, accurate and easily read, and always ready for use.

It consists of the parts and arrangements hereinafter described and claimed.

Figure 1:
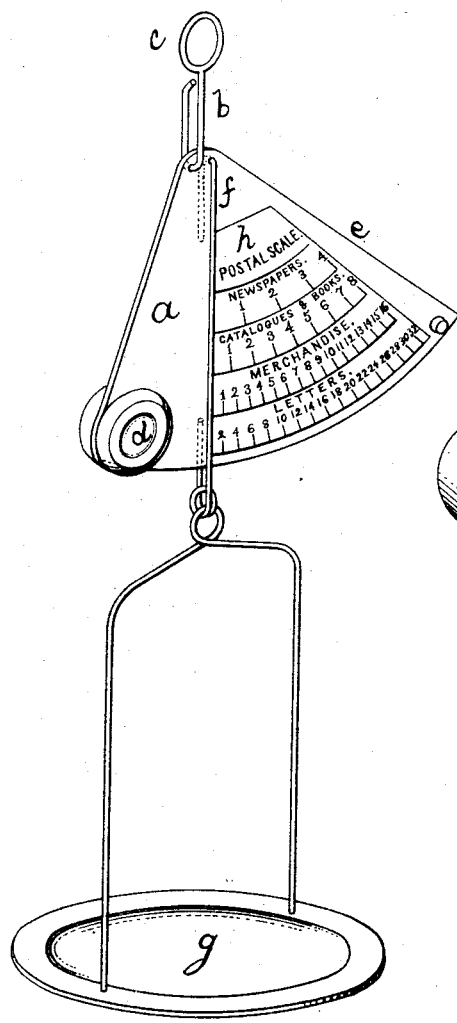
Figure 2:
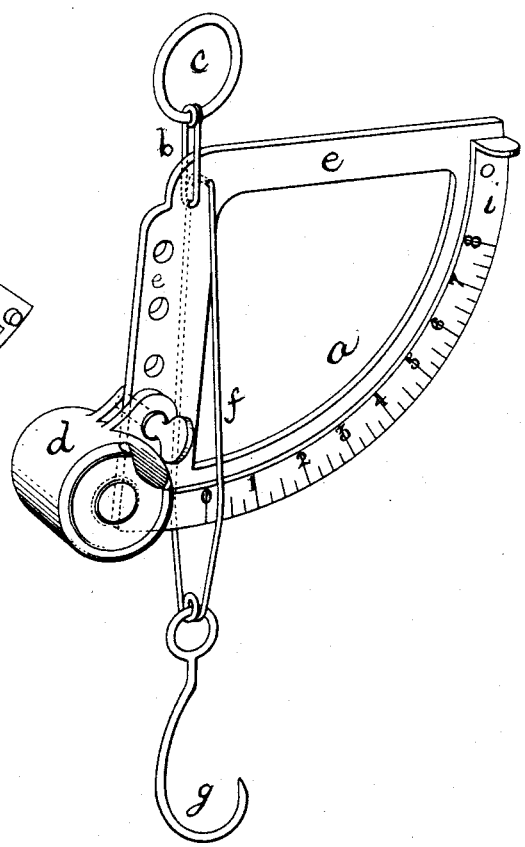

The drawings are perspective views of two sizes of my scale, Figure 1 showing a small form, adapted to weighing postal-matter, drugs, or the like, and Fig. 2 showing another small form for household use, and a modification which may be made in the construction.

An arc, $a$, provided with a graduated scale on its periphery, or a printed or stamped dial upon its face, is suspended at a point near one side or edge upon a fulcrum hook or loop, $b$, attached to a ring or handle, $c$, whereby the balance may be held up. By means of a weight or counterpoise, $d$, affixed to the lower part of one of the arms or radii of the arc, this arm is made to hang vertically from the fulcrum or loop $b$, while the other arm, $e$, or upper radius of the arc, is raised to a position more nearly horizontal to the fulcrum. The upper end of an index rod or wire, $f$, is inserted in the upper arm at a point near the fulcrum, so that when the hook or tray $g$ is attached to the lower end of this index-rod and the balance is at rest, the rod or wire will coincide with the zero-line on the scale or dial. The article or object to be weighed being now placed upon the tray or hook, the upper arm of the arc will be depressed and the scale or dial moved forward under the index-rod, so as to indicate the exact weight of the object in pounds or fractions thereof. It will not be necessary, as in spring-scales, to lift the scale and object to the level of the eye to read the weight, as the figures upon the scale falling directly under the index-wire can be easily read, even though the object be lifted only an inch from the ground. The weight or counterpoise $d$, shown on the lower end of the vertical arm of the arc, may be affixed permanently to a point on this arm, or be so made as to be shifted up or down when it is desired to vary the capacity of the scale or adjust it to a printed or stamped dial. This stamped dial $h$ may be used instead of the graduated scale $i$ on the periphery of the arc or in connection with it, and may be so marked as to indicate at a glance the exact amount of postage required to be paid upon the article weighed, whether it be a letter, newspaper, or other mailable matter, without the necessity of consulting the table of rates of postage. The dial may also be graduated to show troy or apothecaries' weight or the French system, and their equivalents in the ordinary avoirdupois at the same time. It may also be marked to show the value in money of any quantity of an article weighed at designated prices per pound.

The drawings show two forms or sizes of my weighing apparatus, one as constructed for postal matter, and the other for weighing objects not exceeding eight pounds; but it may be made of capacity to weigh any article that can be lifted from the ground, whether by hand or the use of leverage.

The arc may be cast with the counterpoise in one piece in any metal or material strong enough to support the object to be weighed; or, for light objects, it may be cut out of sheet metal, and the counterpoise and scale affixed in their proper positions.

The scale may be provided with a second fulcrum-hook, and the dial-plate or label on the reverse side so marked as to show a different graduation. Thus in the family scale one side may be marked to show, say, four pounds and minute subdivisions, while by using the other hook the scale will weigh and the label indicate as much as ten pounds and the fractions. The postal scale, also, when provided with the double loop, may be marked on one side for postage, and the label on the other face of the arc indicate pounds avoirdupois, and equivalents thereof, according to other systems.

I claim as my invention and desire to secure by Letters Patent—

1. In a weighing apparatus, a swinging arc formed of one piece of metal, suspended by its vertical arm from a knife-edged loop and having an adjustable counterpoise, $d$, arranged upon said vertical arm and a graduated scale attached to the curved portion, in combination with the index rod and scale-hook, arranged and constructed as shown and described, and for the purposes set forth.

2. In a weighing apparatus, the arm $e$, having a series of perforations to admit of the adjustment of the counterpoise $d$, arranged as shown, in combination with the curved graduated scale $i$, index-rod $f$, loop $b$, ring $c$, and hook or scale-pan $g$, all constructed as shown and described, and for the purposes set forth.

3. In a weighing apparatus, a swinging arc provided with an adjustable counterpoise, constructed as described, said arc having upon its face an engraved or printed scale graduated to show different rates of postage, or values, or weights, according to different systems, in combination with the index-rod and tray, substantially as specified and shown, and for the purposes set forth.

LOREN R. WITHERELL.

In presence of—
JULIUS C. HASLER,
R. HANSON.